(12) United States Patent
Tiernay

(10) Patent No.: US 7,772,977 B2
(45) Date of Patent: *Aug. 10, 2010

(54) INTERMODULATION MITIGATION TECHNIQUE IN AN RFID SYSTEM

(75) Inventor: Robert Tiernay, Albuquerque, NM (US)

(73) Assignee: TC License Ltd., Hummelstown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/337,962

(22) Filed: Dec. 18, 2008

(65) Prior Publication Data

US 2009/0206998 A1 Aug. 20, 2009

Related U.S. Application Data

(63) Continuation of application No. 11/137,797, filed on May 26, 2005, now Pat. No. 7,518,532.

(51) Int. Cl.
*G08B 13/14* (2006.01)

(52) U.S. Cl. ............ 340/572.1; 340/571; 340/572.4; 340/928; 340/825.52; 340/825.49; 340/10.1; 340/825.72; 342/42; 342/51

(58) Field of Classification Search .......... 340/928, 340/10.1, 10.3, 933, 935, 825.73, 572.5
See application file for complete search history.

(56) References Cited

U.S. PATENT DOCUMENTS

| | | | |
|---|---|---|---|
| 3,771,060 A * | 11/1973 | Wycoff | 455/703 |
| 3,866,124 A | 2/1975 | Wycoff | |
| 4,321,539 A * | 3/1982 | Trump | 324/328 |
| 4,665,395 A | 5/1987 | Van Ness | |
| 5,128,669 A | 7/1992 | Dadds et al. | |
| 5,164,732 A | 11/1992 | Brockelsby et al. | |
| 5,302,956 A * | 4/1994 | Asbury et al. | 342/70 |
| 5,355,513 A * | 10/1994 | Clarke et al. | 455/20 |
| 5,525,992 A * | 6/1996 | Froschermeier | 340/10.2 |
| 5,701,127 A * | 12/1997 | Sharpe | 340/10.2 |
| 5,757,288 A | 5/1998 | Dixon et al. | |
| 5,883,575 A | 3/1999 | Ruby et al. | |
| 6,064,320 A | 5/2000 | d'Hont et al. | |
| 7,109,844 B2 | 9/2006 | Taki et al. | |

* cited by examiner

*Primary Examiner*—Daniel Wu
*Assistant Examiner*—Son M Tang
(74) *Attorney, Agent, or Firm*—Blank Rome LLP

(57) ABSTRACT

When multiple readers for RF transponders have to be placed in close proximity, such as in adjacent lanes of a highway toll barrier, they can be set to operate at different frequencies. When signals from two adjacent ones of the readers interfere, the resulting signal includes interference terms whose frequencies equal the sum of the reader frequencies and the difference between the reader frequencies. To remove such interference terms while passing the desired terms, a tag includes a low-pass or other frequency-selective filter.

7 Claims, 4 Drawing Sheets

US 7,772,977 B2

INTERMODULATION MITIGATION TECHNIQUE IN AN RFID SYSTEM

CROSS-REFERENCE TO RELATED APPLICATION

The present application is a Continuation of U.S. patent application Ser. No. 11/137,797, entitled "Intermodulation Mitigation Technique in an RFID System," by Robert W. Tiernay, filed May 26, 2005, now U.S. Pat. No. 7,518,532.

FIELD OF THE INVENTION

The present invention is directed to radio frequency communication systems and more particularly to a method and apparatus to mitigate intermodulation effects from adjacent readers in RFID systems.

BACKGROUND OF THE INVENTION

Fields of endeavor ranging from manufacturing to highway toll collection present a continuing challenge to monitor the movements of objects. There is thus a continuing goal to interrogate the location of objects in an inexpensive and streamlined manner.

One example of an identification system for monitoring the locations of objects uses an RF (radio-frequency) transponder device (commonly known simply as a "tag") affixed to an object to be monitored, in which a reader or interrogator unit transmits an interrogation signal to the device. The tag receives the interrogation signal and then generates and transmits a responsive signal.

An example will be explained with reference to FIGS. 1 and 2. In the E-ZPASS$^{SM}$ system for toll collection, in use from Massachusetts to Virginia, a vehicle 102 has a tag 104 mounted on its windshield. As the vehicle 102 approaches a toll barrier, a reader antenna 106 mounted in the toll barrier interrogates the tag 104. The identification received from the tag 104 allows the authority maintaining the toll facility to deduct the amount of the toll from a prepaid account associated with the tag 104.

Currently in the art, RFID systems use frequency separation and time domain multiplexing in combination to allow multiple readers to operate closely together within the bandwidth limitations imposed by radio regulatory authorities. In transportation and other applications, there is a compelling need for readers to operate in close proximity. In the example of a toll collection system, as seen in FIG. 1, readers in many lanes of traffic 108 must be operated side by side to read tags 104 present in each lane 108 simultaneously.

Many technical obstacles limit system performance when readers are closely spaced. One of the major problems or technical obstacles is downlink interference at the tag. That occurs when a tag 104 receives the downlink signals DLS from two or more reader antennas 106, such that the downlink signals DLS interfere with one another. In systems using amplitude modulation such as on-off keying, such interference results in waveform distortion after detection.

SUMMARY OF THE INVENTION

Thus, an unaddressed need exists in the art to address the aforementioned deficiencies and inadequacies associated with waveform distortion after detection of the downlink signals from adjacent readers.

It is therefore an object of the present invention to provide an apparatus and method for mitigating intermodulation effects for adjacent readers in amplitude modulation RFID systems.

To achieve the above and other objects, a frequency-selective filter such as a low-pass filter is added at the output of the diode detector of the tag antenna. The raw signal from the detection of the interfering downlink signals includes components based on the frequency of each of the interfering signals, the difference in the frequencies, and the sum of the frequencies. Thus, given a difference in frequencies between adjacent ones of the reader antennas, an appropriate frequency-selective filter can be used to filter out undesired components of the signal.

During the design of the toll barrier or other facility at which the readers will be used, the frequencies are determined, so that the difference in frequencies between any two adjacent ones of the readers is known. That difference in frequencies is used to select the appropriate frequency-selective filter. Alternatively, if a particular frequency-selective filter is desired to be used, the design stage can include selection of the frequency difference accordingly.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
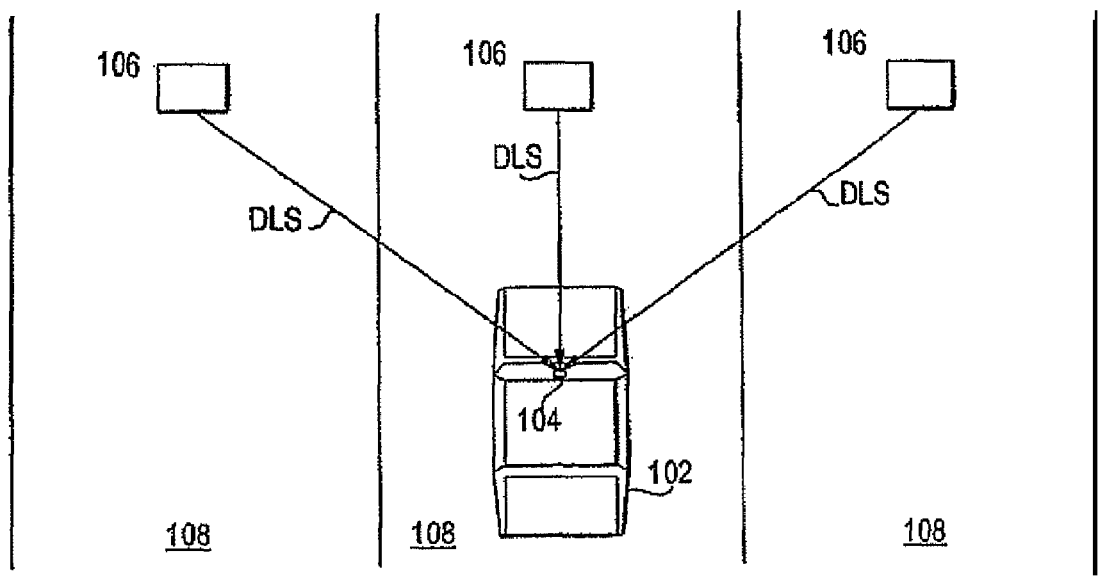
FIG. 1 is an aerial view of a portion of a toll facility in which a vehicle approaches a toll barrier.
Figure 2:
FIG. 2 is a side view of the vehicle and one of the reader antennas of FIG. 1.
Figure 2:
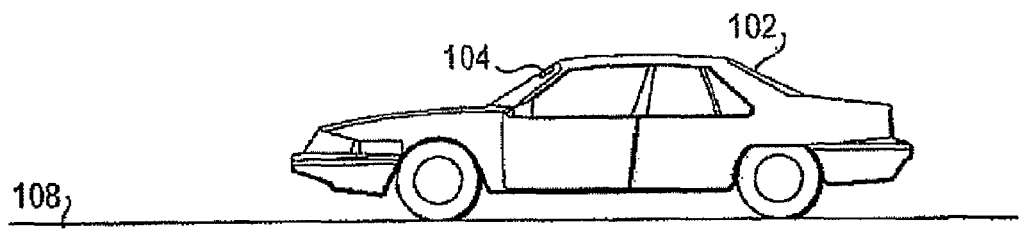

A preferred embodiment of the present invention will be set fort in detail with reference to the drawings, in which like reference numerals refer to like elements throughout.

Figure 3A:
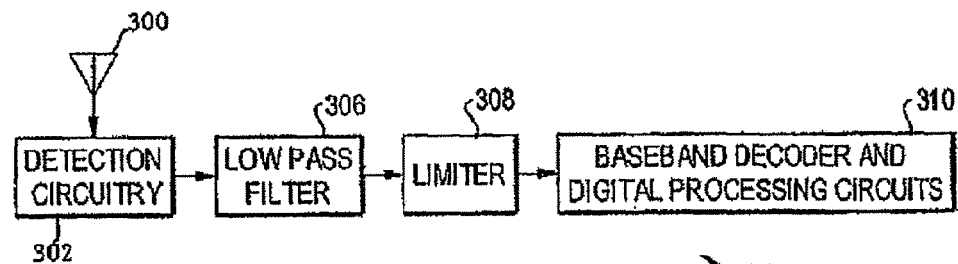
FIG. 3a is a schematic diagram of a tag according to the preferred embodiment.
Figure 3B:
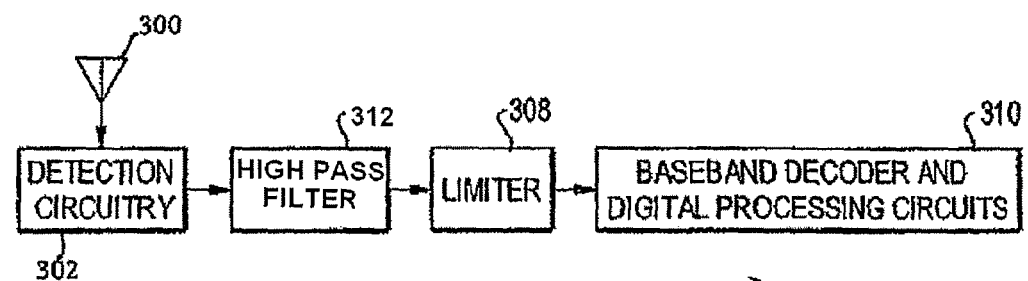
FIG. 3b is a schematic diagram of a tag according to another exemplary embodiment.

FIGS. 3a and 3b are schematic diagrams of a tag 104 according to the preferred embodiment. The tag 104 includes the following components connected in series: an antenna 300, detection circuitry (e.g., diode detector) 302 or a high-pass filter 312, a low-pass filter 306, a limiter 308 and a baseband decoder and associated digital processing circuits 310.

The tag 104 functions in the following manner. The antenna 300 receives an amplitude modulated RF signal from a reader, with interference from an adjacent reader. The detection circuitry 302 detects that signal and outputs a baseband analog signal with a high level of interference. The low-pass filter 306 low-pass or the high-pass filter 312 filters the signal to reduce the level of interference, in a manner to be explained below for the case using the low-pass filter 306. The baseband analog signal with the reduced level of interference is applied to the limiter 308, which applies a digital signal to the baseband decoder and digital processing circuits 310.

Figure 4:
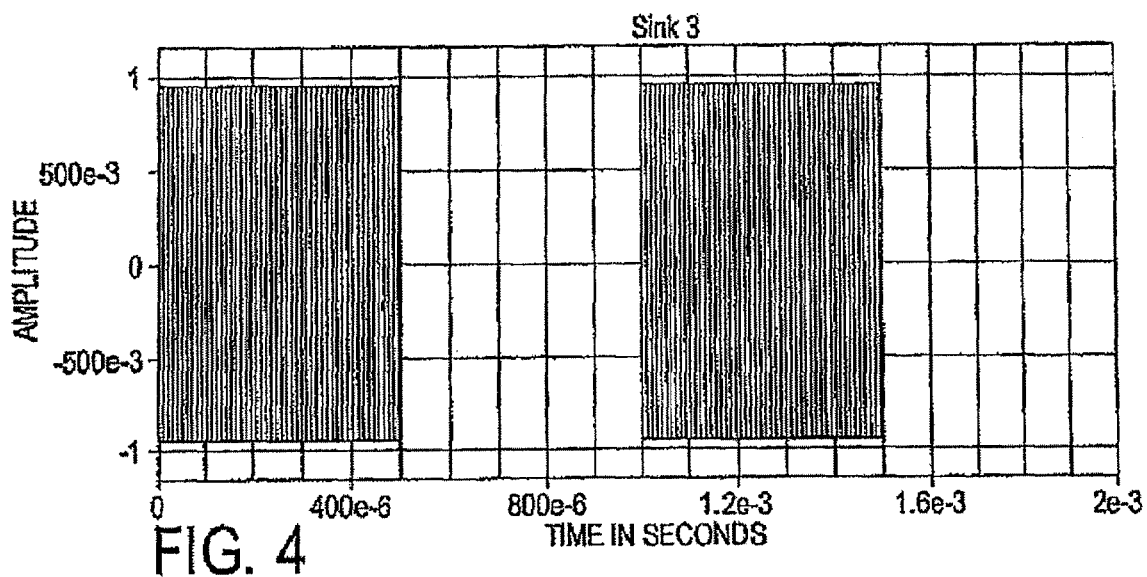
FIG. 4 is a graph of a desired signal to be detected by the tag of FIGS. 1 and 2.
Figure 5:
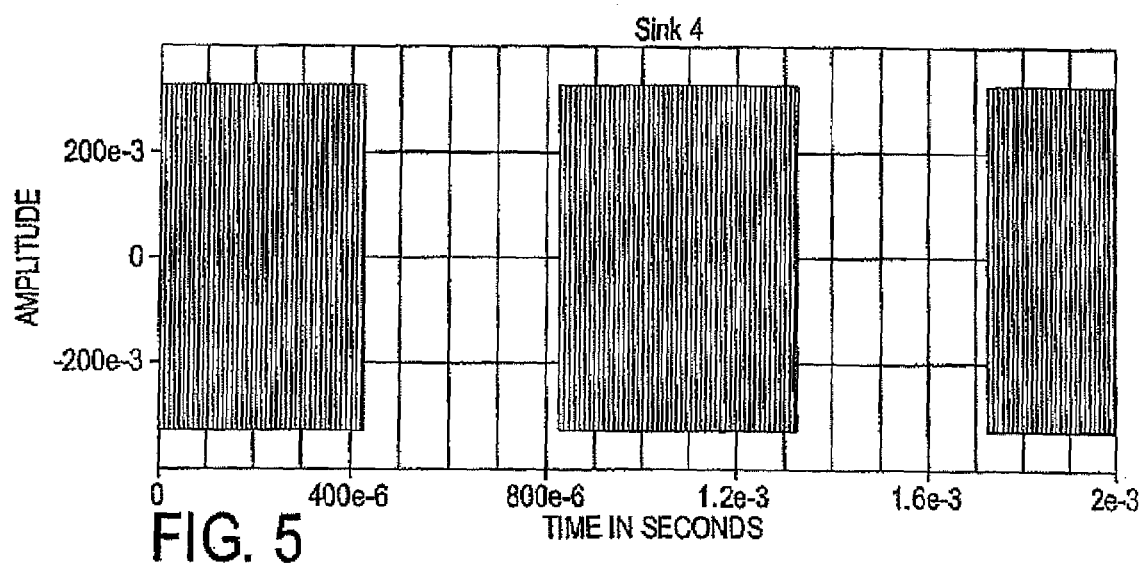
FIG. 5 is a graph of an interfering signal associated with the desired signal described in FIG. 4.
Figure 6:
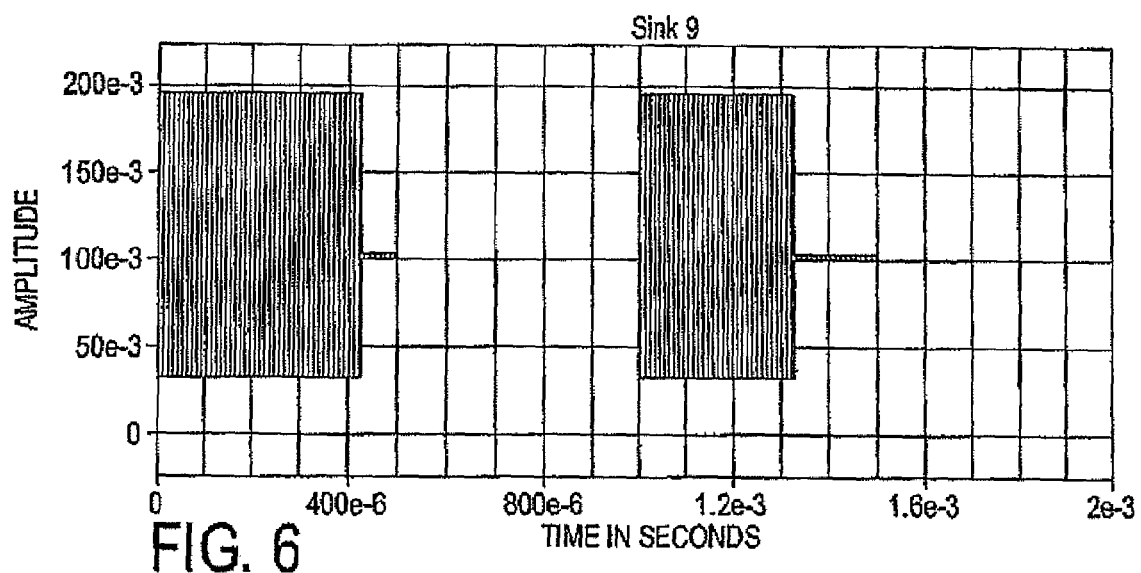
FIG. 6 is a graph of a detected output with signals added together with no low-pass filter.

The theory of operation of the tag 104 with the low-pass filter 306 will now be explained with reference to FIGS. 4-7. FIG. 4 shows a desired signal; FIG. 5, an interfering signal; FIG. 6, the detected output, resulting from the desired and interfering signals, without the filter; and FIG. 7, the detected output with the filter.

Let:

$V_d(t)$ be the envelope of the desired on-off keyed RF signal;
$V_i(t)$ be the envelope of the interfering on-off keyed RF signal;
$\omega_d$ be the frequency of the desired RF signal (microwave frequency);
$\omega_i$ be the frequency of the interfering signal;
$V_o$ be the output of the diode detector; and
$V_{in}$ be the input to the diode detector.

Then the desired signal, shown in FIG. 4, is given by $$V_d(t)*\cos(\omega_d t),$$

while the interfering signal, shown in FIG. 5, is given by $$V_i(t)*\cos(\omega_i t).$$

The signal received at the detector, shown in FIG. 6, is the sum of the desired and interfering signals, namely, $$V_{in}=V_d(t)*\cos(\omega_d t)+V_i(t)*\cos(\omega_i t).$$

The detection process is often modeled as a second-order process, such that $$V_o=V_{in}^2.$$

Substituting from the above, $$V_o(V_d(t)*\cos(\omega_d t)+V_i(t)*\cos(\omega_i t))^2=V_d(t)^2*\cos^2(\omega_d t)+V_i(t)^2*\cos^2(\omega_i t)+2*V_i(t)*\cos(\omega_d t)*V_d(t)*\cos(\omega_i t).$$

The first two terms in the equation above represent the output of the diode for the desired and interfering signals as if they were received separately, while the third term represents the results of the interference between those two signals. The effects of the interfering signal (the second term) cannot be removed by the tag. However, the effects of interference in the third term can be reduced as shown below.

Using the following well known identity from trigonometry.

$$\cos A \cos B = 0.5(\cos(A+B)+\cos(A-B)),$$

the third term can be rewritten as $$V_i(t)*V_d(t)*\cos((\omega_d+\omega_i)t)+V_i(t)*V_d(t)*\cos((\omega_d-\omega_i)t).$$

Figure 7:
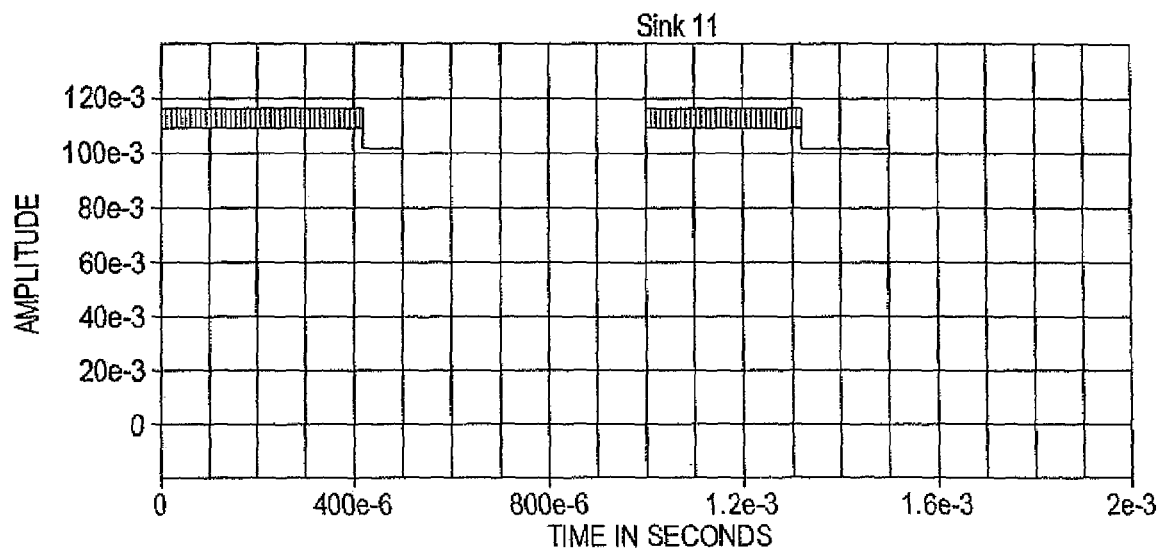
FIG. 7 is a graph of a detected output with signals added together after filtering with a low-pass filter.

The first term is approximately twice the frequency of the desired signal, while the second component is at the difference frequency of the two components. The second component can be filtered out (removed) by attaching a low-pass filter 306 to the output of the diode detector and setting the cutoff frequency of that filter well below the difference frequency. The difference frequency will be much less than the sum of the two frequencies; thus, the filter will also remove the first term. The resulting filtered signal is shown in FIG. 7.

Various design options for the low-pass filter 306 will now be described. The filter implementation is directly related to the frequency difference between the desired and interfering signals. When that frequency difference is large compared to the data rate (for example, 10 times) a simple RC low-pass filter can be used because the filter will not remove any of the frequency components of the desired signal.

Figure 8:
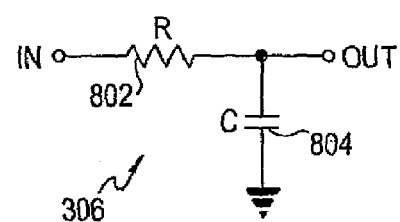
FIG. 8 is a circuit diagram of a low-pass filter that may be used in the tag of FIG. 3.

An example of such a simple RC filter is shown in FIG. 8. As shown, a resistor 802 is connected between the input and output of the filter, while a capacitor 804 is connected between the output and a ground. Those skilled in the art who have reviewed the present disclosure will be able to select values of the resistance R of the resistor 802 and the capacitance C of the capacitor 804 in accordance with the overall circuitry and the difference in frequencies between adjacent ones of the readers. The filter of FIG. 8 is desirable because it has only two components and can easily be implemented in an ASIC in the tag.

When the frequency difference is comparable to the data rate, the low-pass filter implementation will require many components to achieve the same level of performance because the filter must roll off quickly to allow the desired signal to get through and yet attenuate the difference frequency. Various designs for low-pass filters are known in the art and can be used in the present invention.

While a preferred embodiment of the present invention has been set forth in detail above, those skilled in the art who have reviewed the present disclosure will readily appreciate that other embodiments can be realized within the scope of the invention. For example, the use of the present invention in a toll collection system is illustrative rather than limiting. Also, depending on the values of $\omega d+\omega_i$ and $\omega_{d-}\omega_i$, it may be necessary or desirable to use a high-pass filter as shown in FIG. 3b instead of, or in addition to, the low-pass filter to remove the terms related to the interference effects without also filtering out the desired signal. Therefore, the present invention should be construed as limited only by the appended claims.

What is claimed is:

1. A transponder for receiving an interrogation signal from a reader at a first frequency and sending a response signal from the transponder at a third frequency, while mitigating interference effects from an interfering signal at a second frequency, the transponder comprising:

an antenna for receiving the interrogation signal from the reader;

a detector in communication with the antenna, said detector detecting the interrogation signal and outputting a baseband analog signal representing the interrogation signal;

a frequency-selective filter comprising a low-pass filter in communication with the detector to receive the baseband analog signal output by the detector, said frequency-selective filter performing frequency-selective filtering of the baseband analog signal to output an analog signal with reduced interference; and a signal processor in communication with the frequency-selective filter to receive the analog signal with the reduced interference, said signal processor processing the analog signal with the reduced interference to extract information from the analog signal with the reduced interference;

wherein the low-pass filter has a cutoff frequency which is less than a difference between the first frequency and the second frequency.

2. The transponder of claim 1, wherein the low-pass filter comprises an input, an output, a resistor coupled between the input and the output, and a capacitor coupled between the output and a ground.

3. The transponder of claim 1, wherein the signal processor comprises:

a limiter for receiving the analog signal with reduced interference from the frequency-selective filter and generating a digital signal; and a baseband decoder for receiving the digital signal from the limiter.

4. A transponder for receiving an interrogation signal from a reader at a first frequency and sending a response signal from the transponder at the first frequency, while mitigating interference effects from an interfering signal at a second frequency, the transponder comprising:

an antenna for receiving the interrogation signal from the reader and the interfering signal at the second frequency;

a detector in communication with the antenna, said detector detecting the interrogation signal and the interfering signal and outputting a baseband analog signal representing the interrogation signal, the interfering signal, and a combination of the interrogation signal and the interfering signal;

a frequency-selective filter comprising a high-pass filter in communication with the detector to receive the baseband analog signal output by the detector, said frequency-selective filter performing frequency-selective filtering of the baseband analog signal to output an analog signal, wherein the interfering signal is reduced by an amount proportional to a square of the interfering signal; and a signal processor in communication with the frequency-selective filter to receive the analog signal output by the frequency-selective filter, said signal processor processing the analog signal output by the frequency-selective filter to extract information from the analog signal output by the frequency-selective filter;

wherein the high-pass filter has a cutoff frequency which is greater than a difference between the first frequency and the second frequency and less than a frequency of modulation of the interrogation signal from the reader.

5. The transponder of claim 4, wherein the signal processor comprises:

a limiter for receiving the analog signal with reduced interference from the frequency-selective filter and generating a digital signal; and a baseband decoder for receiving the digital signal from the limiter.

6. A transponder for receiving an interrogation signal from a reader at a first frequency and sending a response signal from the transponder at a third frequency, while mitigating interference effects from an interfering signal at a second frequency, the transponder comprising:

an antenna for receiving the interrogation signal from the reader and the interfering signal at the second frequency;

a detector in communication with the antenna, said detector detecting the interrogation signal and the interfering signal and outputting a baseband analog signal representing the interrogation signal, the interfering signal, and a combination of the interrogation signal and the interfering signal;

a frequency-selective filter comprising a high-pass filter in communication with the detector to receive the baseband analog signal output by the detector, said frequency-selective filter performing frequency-selective filtering of the baseband analog signal to output an analog signal, wherein the interfering signal is reduced by an amount proportional to a square of the interfering signal; and a signal processor in communication with the frequency-selective filter to receive the analog signal output by the frequency-selective filter, said signal processor processing the analog signal with the reduced interference to extract information from the analog signal output by the frequency-selective filter;

wherein the high-pass filter has a cutoff frequency which is greater than a difference between the first frequency and the second frequency and less than a frequency of modulation of the interrogation signal from the reader.

7. The transponder of claim 6, wherein the signal processor comprises:

a limiter for receiving the analog signal with reduced interference from the frequency-selective filter and generating a digital signal; and a baseband decoder for receiving the digital signal from the limiter.

* * * * *